United States Patent

Wheeler

[11] 4,030,032
[45] June 14, 1977

[54] RADIO TRANSMISSION SYSTEM
[75] Inventor: Harold A. Wheeler, Great Neck, N.Y.
[73] Assignee: Westinghouse Electric Corporation, Pittsburgh, Pa.
[22] Filed: Apr. 5, 1960
[21] Appl. No.: 20,100
[52] U.S. Cl. .................................. 325/28; 343/719
[51] Int. Cl.² ......................................... H04B 13/02
[58] Field of Search ............... 250/3, 4, 5; 343/719; 325/28

[56]  References Cited
UNITED STATES PATENTS

| 1,349,104 | 8/1920 | Rogers | 343/719 |
| 1,424,805 | 8/1922 | DeForrest | 250/3 |
| 2,653,220 | 9/1953 | Bays | 325/28 |
| 2,992,325 | 7/1961 | Lehan | 325/28 |

Primary Examiner—Howard A. Birmiel
Attorney, Agent, or Firm—R. M. Trepp

EXEMPLARY CLAIM

1. A method of radio transmission comprising radiating electromagnetic waves in the earth's crust through a "deep wave guide" formed of basement rock bounded on its upper side by a surface layer of sufficient conductivity to form the upper boundary of the wave guide and bounded on its lower side by a region having a temperature of several hundred degrees Centigrade, which temperature causes the lower region to have a conductivity which is high relative to that of the basement rock.

8 Claims, 3 Drawing Figures

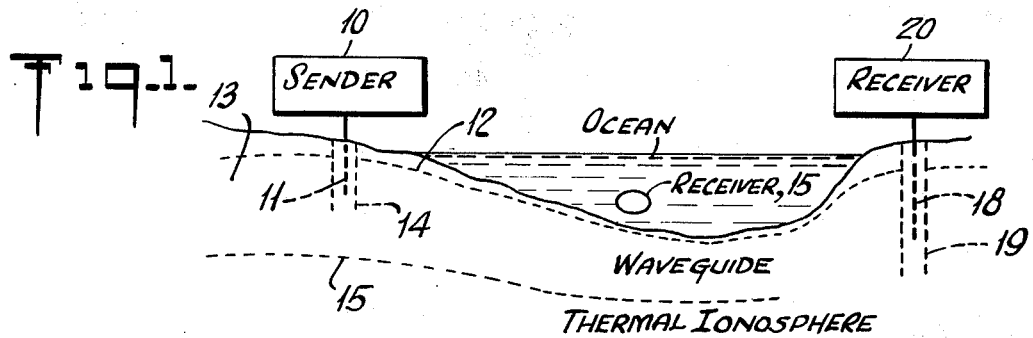
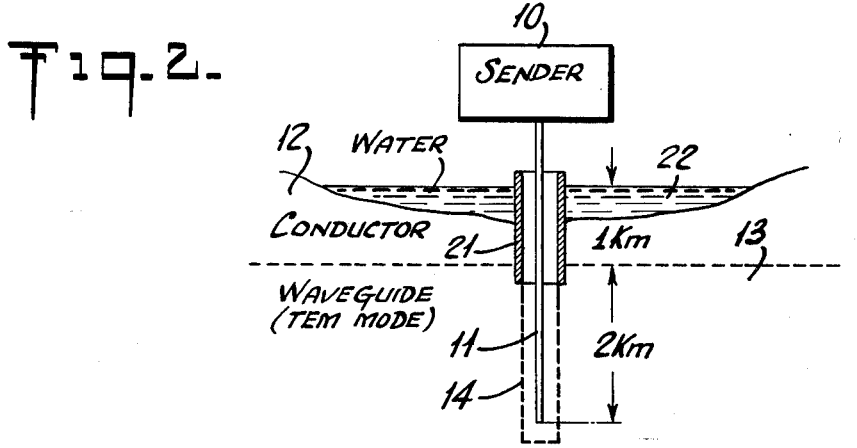
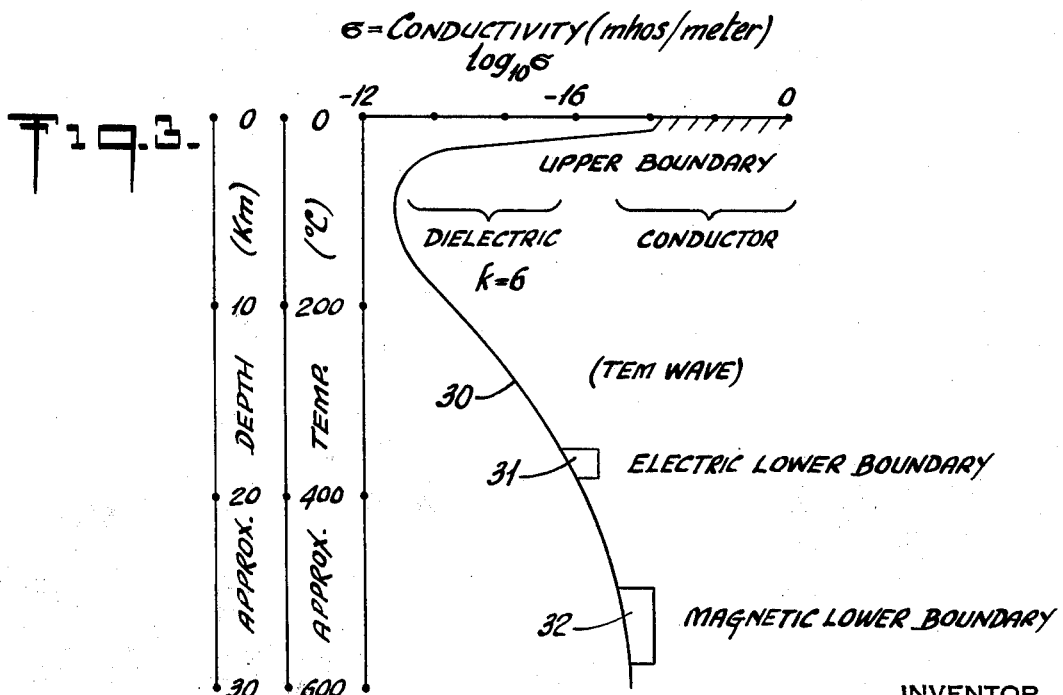

RADIO TRANSMISSION SYSTEM

The present invention relates to a system and method of radio transmission and particularly a system in which the radio waves travel through the interior of the earth.

Many proposals have been made for the transmission of radio waves through the earth, rather than along the outer surface of the earth. None of these proposals, however, has proved useful and capable of providing transmission or communication over substantial distances. Although various types of antennnas and various frequencies have been proposed, efficient radio transmission has never been achieved because of the great attenuation of the radio waves which would occur in the proposed systems.

The present invention is based upon the discovery that there exists an accessible useful substantially horizontal deep wave guide in the earth's crust. The dielectric of this wave guide is basement rock of very low conductivity. The upper boundary of the wave guide is formed by the conductive layers within about 2 kilometers of the surface of the earth. The lower boundary of the wave guide is formed by a high temperature conductive layer at a depth of the order of 20 or 30 kilometers below the surface. Because it has a number of properties similar to the upper ionoshpere this high temperature conductive layer will be called the "thermal ionosphere" by analogy to the well known "radiation ionoshphere" above the earth. This "deep wave guide" is located under land and sea over the entire surface of the earth. The deep wave guide may be used for radio transmission between distant points on the earth's surface or for transmission from a point near the shore of the ocean to a submarine on the floor of the ocean. The sending antenna, for example, can be a long conductor in a drill hole in the basement rock and the receiving antenna may be similar to the transmitting antenna, or a vertical loop in the water near the ocean floor.

The present invention obviously has many applications; for example, radio communication, geological investigation, prospecting, surveying, etc. It is among the objects and advantages of the invention to provide a relatively secret system of transmission or communication and one which is relatively free from atmospheric noise.

Another object of the invention is to provide a system which is practically indestructibel, especially if the sending and receiving equipment is mounted below the surface of the earth as, for example, in pill boxes.

A still further object of the invention is to provide a radio communication system capable of transmitting to submerged submarines.

Many other objects and advantages of the invention will become evident from the following description and the drawings, in which:

FIG. 1 is a schematic diagram of one embodiment of the invention;

FIG. 2 is a diagram of an antenna installation; and

FIG. 3 is a diagram of the deep wave guide characteristics showing particularly the variation of conductivity with depth.

It has been discovered that there is a deep wave guide in the earth's crust which extends under all the surface area and accordingly provides the possibility of wave propagation between distant points in the earth and under the ocean floor. This wave guide comprises basement rock as a dielectric between upper and lower conductive boundaries. The upper boundary is formed of the well known geological strata located between the surface and the basement rock, with conductivity provided by electrolytic solutions and semi-conductive materials. The lower boundary is provided by high temperature produced conductivity in the basement rock.

The lower boundary is similar to the usual ionoshpher, being a region of gradually increasing conductivity. In the usual ionosphere, caused by extraterrestial radiation, the conductivity increases with height. In the present case, however, the conductivity increases with depth and is caused by the increasing temperature of the dielectric material. This conductive region may, therefore, be designated the "inverted ionosphere" or the "thermal ionosphere".

Referring particularly to FIG. 1, there is shown a radio sending station 10 connected to a vertical antenna 11 extending through the conductive strata 12 of the surface of the earth into the basement rock 13 therebelow. A drill hole 14 into the earth may be made for the antenna 11. The antenna, therefore, launches a vertically polarized transverse-electromagnetic (TEM) wave into the basement rock. The radiated wave will be substantially confined between the layer 12 and the "thermal ionoshpere" 15 below the solid basement rock 13. However, enough of the wave may escape to be received by a receiver 15 at the bottom of the ocean. This receiver may be a vertical loop antenna for providing communication between the sending station 10 and a submarine carrying the receiver 15. For such communication the sending station 10 may advantageously be placed near the shore. The waves radiated by the sending station and antenna 11 may also be received by an antenna 18 similar thereto extending into a drill hole 19 in the basement rock at a distant point and suitably connected as by a coaxial cable to a radio receiver 20.

As can be seen from FIG. 2 the sending antenna may comprise a metallic pipe 21 extending through the conductive layer at the surface of the earth which, for example, may have a depth of 1 kilometer, although it will be recognized that this layer will vary in depth from one place to another over the earth. The pipe 21 preferably extends a short distance into the basement rock 13 beneath the conductive layer 12 within the drill hole 14, which may have a depth, say, of 3 kilometers or more. The inner vertical conductor 11 forms a coaxial cable with the pipe 21 and as shown in FIG. 2 extends a distance of about 2 kilometers below the conductive layer 12. The upper end of pipe 21 is in contact with a conducting surface 22 such as water or radial wires laid in the ground in the manner of a counterpoise. Sender 10 is then connected to the coaxial cable 11 and 21 and supplies radio waves thereto which may have a carrier frequency of 1.5 kilocycles, for example. The drill hole 14 is preferably filled with oil for insulating purposes. The sending station may be located below the surface of the earth.

The diagram of FIG. 3 is practically self-explanatory. It shows how the temperature and the resulting conductivity may typically vary with depth, especially in the basement rock at depths exceeding a few kilometers. The abscissa of the diagram is the conductivity and the ordinates of the diagram are the depth in kilometers and the accompanying approximate temperature, which varies with the depth. The upper boundary of the wave guide is fairly well defined, at a depth of the order of 1 km. or perhaps down to several kilometers. Its conductivity, in most common materials, ranges from a maximum of 4 mhos/meter in sea water down to about $10^{-4}$ in rather dry, nonconductive minerals.

The dielectric layer, shown between depths of about 2 and 20 kilometers, may have a very low conductivity on the order of $10^{-6}$ to $10^{-11}$ mhos/meter. A conductivity of about $10^{-8}$ provides a useful wave guide. The dielectric constant is about 6.

It can be seen from FIG. 3 that at the lower boundaries of the wave guide, the temperature increases to about 400° C at a depth of 20 kilometers and about 600° C at a depth of about 30 kilometers. The gradual increase in conductivity of this lower region provides an effective boundary for both the electric field and the magnetic field, that for the electric field being closer than that for the magnetic field. The approximate boundary of the electric field in the diagram is indicated at 31 and the approximate boundary of the magnetic field is indicated at 32. In each case, there is a sort of skin depth in the boundaries. Both boundaries 31 and 32 make comparable contributions to the total dissipation factor of the wave guide which determines the exponential attenuation rate.

The location of each lower boundary depends on the frequency, the conductivity and the rate of change of conductivity with depth. In a particular example to be given below these boundaries occur at temperatures in the range of 300° – 600° C. As an example of favorable dimensions of the system according to the invention the following numerical values are given:

| Frequency | 1.5 | Kc |
|---|---|---|
| Dielectric constant | 6 | |
| Wavelength (in dielectric) | 80 | Km |
| Effective boundaries of E field (depths) | 1–18 | Km |
| Effective boundaries of M field (depths) | 1–27 | Km |
| Skin depth for E field (lower boundary) | 1.5 | Km |
| Skin depth for M field (lower boundary) | 4 | Km |
| Length of radiator (in waveguide) | 2 | Km |
| Reactance of radiator | 1600 | ohms |
| Effective length of radiator | 1 | Km |
| Radiation resistance (in waveguide) | 0.4 | ohms |
| Other resistance | 20 | ohms |
| Radiation efficiency | 0.02 | |
| Average power factor of E and M fields, about | 0.1 | |
| Napier distance (for wave attenuation) | 130 | Km |
| Decibel distance (for wave attenuation) | 15 | Km |
| 100-db distance | 1500 | Km |

Where the above values obtain, communication ranges of the order of 1500 km. may be obtained under the surface of the earth.

It will be recognized that the various quantities given above may have different values under various conditions. The principal components of the basement rock are known, but there is imcomplete knowledge of its small content of impurities that determine the conductivity. Measurements have been made of samples down to about one kilometer which substantiate the approximations made above.

I have described my invention and indicated some exemplary embodiments thereof, but it is to be understood that the invention is not to be construed as limited except as defined in the claims.

I claim:

1. A method of radio transmission comprising radiating electromagnetic waves in the earth's crust through a "deep wave guide" formed of basement rock bounded on its upper side by a surface layer of sufficient conductivity to form the upper boundary of the wave guide and bounded on its lower side by a region having a temperature of several hundred degrees Centigrade, which temperature causes the lower region to have a conductivity which is high relative to that of the basement rock.

2. A method according to claim 1, wherein said electromagnetic waves are formed as vertically polarized transverse electromagnetic waves.

3. A method according to claim 2, comprising the step of receiving said waves at a point remote from the point at which they are radiated.

4. A method according to claim 2, comprising the step of receiving said waves at a point near the floor of the ocean.

5. A method according to claim 1, wherein the radiated electromagnetic waves have a frequency below 2 kilocycles.

6. A method according to claim 2, wherein the waves are substantially confined to a layer in the earth extending from a distance of about 1 to 20 kilometers below the surface.

7. For use in a radio transmission system, an antenna comprising an elongated wave guide adapted to be inserted into the earth at a given point, said wave guide having a length sufficient to enable the antenna to be inserted into a "deep wave guide" formed of basement rock, bounded on its upper side by a surface layer of sufficient conductivity to form the upper boundary of the wave guide, and bounded on its lower side by a region having a relatively high temperature, which temperature causes the lower region to have a conductivity which is high relative to that of the basement rock.

8. A method of receiving radio energy comprising receiving electromagnetic waves existing in the earth's crust in a "deep wave guide" formed of basement rock bounded on its upper side by a surface layer of sufficient conductivity to form the upper boundary of the wave guide and bounded on its lower side by a region having a relatively high temperature, which temperature causes the lower region to have a conductivity which is high relative to that of said basement rock.

* * * * *